G. R. STARK.
SPRING CLIP TOOL.
APPLICATION FILED NOV. 19, 1918.
1,308,687.
Patented July 1, 1919.
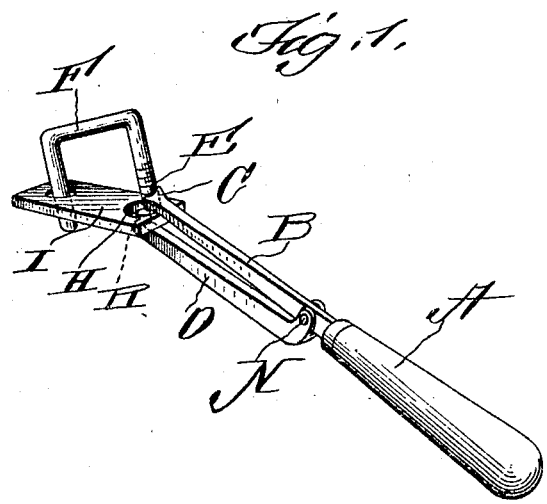
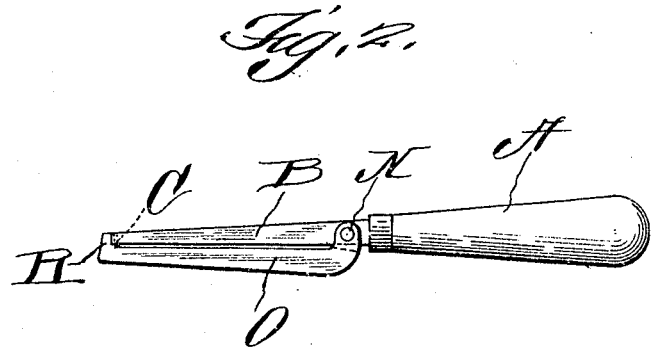
Witnesses
Inventor
G. R. Stark,
By Frank N. Hough
Attorneys

UNITED STATES PATENT OFFICE.

GARA ROSCOE STARK, OF EL CAMPO, TEXAS.

SPRING-CLIP TOOL.

1,308,687.  Specification of Letters Patent.  Patented July 1, 1919.

Application filed November 19, 1918. Serial No. 263,206.

*To all whom it may concern:*

Be it known that I, GARA R. STARK, a citizen of the United States, residing at El Campo, in the county of Wharton and State of Texas, have invented certain new and useful Improvements in Spring-Clip Tools; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in spring clip tools, and consists of a simple device of this nature designed especially for use in repair shops for putting back spring or axle clips where the clip is slightly bent and difficult to replace by hand, the tool serving as a convenient means for bending and forcing the clip in place without injuring the threads thereon.

The invention comprises further details of construction, combination and arrangement of parts which will be hereinafter fully described, shown in the accompanying drawings and then specifically defined in the appended claims.

I illustrate my invention in the accompanying drawings which, with the letters of reference marked thereon, form a part of this application and in which:

Figure 1 is a side elevation, and

Fig. 2 is an enlarged detail view of the tool itself.

Reference now being had to the details of the drawings by letter:

A designates a handle fitted to a stationary bar B having a concaved end C, which is adapted to bear against the threaded portion E of a clip F when it is desired to spring the latter to enter a hole H in the plate I. Pivoted to the bar B, at a point designated by letter N, is a finger O having an angled end R which tapers slightly and which projects beyond the end of the bar B when said finger is swung to the position shown in Fig. 2 of the drawings.

In operation, when it is desired to spring a clip so that it will enter the aperture of a plate, the angled end R of the finger is inserted in the hole of the plate upon the under side of the concaved end of the bar B placed against the threaded portion of the bracket-shaped clip, and by forcing said bar and finger together to the position shown in Fig. 2 of the drawings, the clip may be sprung so that the threaded end may be forced into the hole in the plate, and after the finger is removed the clip may be easily driven through.

What I claim to be new is:

1. A spring clip tool to facilitate forcing a clip through a hole in a plate, consisting of a bar with a finger pivoted thereto and having its free end angled, the end of the bar designed to engage the clip, and the angled end of the finger adapted to engage said hole whereby said clip may be sprung into the hole as the bar and finger are moved together.

2. A spring clip tool for forcing a clip into the hole of a plate, consisting of a bar having its free end concaved and a handle at its opposite end, a finger pivoted to said bar intermediate said handle and its concaved end, and provided with a hooked end designed to engage said hole through which the clip is adapted to be sprung, said concaved portion of the bar designed to engage the threaded portion of the clip while said bar and finger are being moved toward each other.

In testimony whereof I hereunto affix my signature in presence of two witnesses.

GARA ROSCOE STARK.

Witnesses:
 GEO. P. WILLIS,
 L. O. LUNDY.

Copies of this patent may be obtained for five cents each, by addressing the "Commissioner of Patents, Washington, D. C."